United States Patent
Federle et al.

(10) Patent No.: US 7,461,887 B1
(45) Date of Patent: Dec. 9, 2008

(54) AUTOMATIC SUN VISOR SYSTEM

(76) Inventors: Rita Anne Federle, 3663 Pimlico Ct., Indian Springs, OH (US) 45011; Richard James Federle, Jr., 3663 Pimlico Ct., Indian Springs, OH (US) 45011; James Roy Bolin, 1634 Zion La., Hillsboro, OH (US) 45133

( * ) Notice: Subject to any disclaimer, the term of this patent is extended or adjusted under 35 U.S.C. 154(b) by 0 days.

(21) Appl. No.: 11/641,010

(22) Filed: Dec. 19, 2006

(51) Int. Cl.
*B60J 3/02* (2006.01)

(52) U.S. Cl. ............................ 296/97.4; 296/97.8
(58) Field of Classification Search ............ 296/97.4, 296/97.8
See application file for complete search history.

(56) References Cited

U.S. PATENT DOCUMENTS

| | | | |
|---|---|---|---|
| 3,226,151 A | 12/1965 | Reuther | |
| 4,697,843 A | 10/1987 | Tomforde | |
| 4,773,698 A | 9/1988 | Svensson | |
| 4,824,160 A * | 4/1989 | Fleming | 296/97.4 |
| 4,874,195 A | 10/1989 | Lu et al. | |
| 4,902,062 A | 2/1990 | Pusic et al. | |
| 4,919,468 A | 4/1990 | Abu-Shumays et al. | |
| 4,971,381 A | 11/1990 | Abu-Shumays et al. | |
| 4,987,315 A | 1/1991 | Abu-Shumays et al. | |
| 4,988,139 A | 1/1991 | Yamada | |
| 5,000,506 A | 3/1991 | Abu-Shumays et al. | |
| 5,031,952 A * | 7/1991 | Miyamoto et al. | 296/97.4 |
| 5,040,839 A | 8/1991 | Moore | |
| 5,044,687 A | 9/1991 | Abu-Shumays et al. | |
| 5,076,633 A | 12/1991 | Hsu et al. | |
| 5,158,334 A | 10/1992 | Felland | |
| 5,192,110 A | 3/1993 | Mykytiuk et al. | |
| 5,201,563 A | 4/1993 | Liao | |
| 5,344,206 A | 9/1994 | Middleton | |
| 5,409,284 A | 4/1995 | Mahler | |
| 5,443,300 A | 8/1995 | Mohammed | |
| 5,551,744 A | 9/1996 | Liao | |
| 5,720,508 A | 2/1998 | Mohammed | |
| 5,873,621 A | 2/1999 | Kulghadush et al. | |
| 5,902,002 A | 5/1999 | Wilson | |
| 5,947,544 A | 9/1999 | Hubeshi | |
| 6,086,133 A | 7/2000 | Alonso | |
| 6,131,987 A | 10/2000 | Rossiter | |
| 6,189,948 B1 | 2/2001 | Lin | |
| 6,227,601 B1 | 5/2001 | LaFrance | |
| 6,279,984 B1 | 8/2001 | Reina, Jr. | |
| 6,318,788 B1 | 11/2001 | Jaurigue | |
| 6,536,829 B2 | 3/2003 | Schlecht et al. | |
| 6,666,493 B1 | 12/2003 | Naik | |
| 6,811,201 B2 | 11/2004 | Naik | |

(Continued)

*Primary Examiner*—Dennis H Pedder
(74) *Attorney, Agent, or Firm*—Jagtiani + Guttag (57) ABSTRACT

The present invention provides a sun visor system comprising: a main visor system assembly for mounting on a motor vehicle; a visor guide assembly; a visor extension arm having a first end that pivotally engages the main visor system assembly and a second end including an opening therethrough; a sun visor having an visor guide bar extending through and pivotally engaging the opening and slidably engaging the visor guide assembly, wherein the main visor system assembly includes driving means for moving the visor extension arm between an extended and retracted position, and wherein when the visor extension arm is moved between the extended and retracted positions to cause the visor guide to bar travel along the visor guide assembly, thereby moving the visor between a side window sun protecting position and a visor retracted position.

20 Claims, 3 Drawing Sheets

U.S. PATENT DOCUMENTS

| | | |
|---|---|---|
| 6,857,693 B2 | 2/2005 | Hattass et al. |
| 7,014,243 B2 | 3/2006 | Nakajo |
| 7,059,651 B2 | 6/2006 | Böhm et al. |
| 7,108,307 B1 | 9/2006 | Sahara et al. |
| 7,347,479 B2 * | 3/2008 | Suzuki et al. ............. 296/97.1 |

* cited by examiner

AUTOMATIC SUN VISOR SYSTEM

BACKGROUND

1. Field of the Invention

The present invention broadly relates to a sun visor system (e.g., an automatic sun visor system) for a motor vehicle (e.g., an automobile).

2. Related Art

Because of the problems of glare from the sun impacting the driver (and/or passenger(s)), sun visor systems are often provided as standard equipment for motor vehicles such as automobiles, trucks, etc. Many of these sun visor systems are in the form of fold down visors, which may be articulated for pivotal movement downwardly into position, and may also be articulated for movement sideways so that the visor may be used to protect the driver (and passenger(s)) from the sun and/or resulting glare either through the front windshield or side windows.

Many of these sun visor systems require a user to manually engage and position the visor which may be difficult to achieve in certain instances depending on the height, reach, etc., of the user, as well as whether the user is, for example, occupied in driving the motor vehicle. In the case of users in the front seat, each manual visor may also only cover at any one time the front windshield, or a front side window, but not both. These manual sun visor systems may also obstruct a substantial portion of the viewing area of the user. Tinting of the front windshield may also be provided, but this is may be limited to the upper edges of the front windshield, thus providing no benefit against the sun and/or the resulting glare to the front or back side windows on the driver and/or passenger sides. Manual curtains may also be provided, but may not be practical for the front windshield or slanted sides of windows.

Automated or powered sun visor systems may be provided to achieve protection against the sun and the glare resulting therefrom. See, for example, U.S. Pat. No. 5,720,508 (Mohammed), issued Feb. 14, 1998; U.S. Pat. No. 6,279,984 (Reina, Jr.), issued Aug. 28, 2001. Many of these automated or powered sun visor systems are made to address protecting against sun and the resulting glare through the front windshield, but not the front or back side windows. Providing automated or powered sun visor systems for the front or back side windows may create challenges because of difficulties in locating the system so that it is convenient to use, hidden from view when not deployed, installable with many different types of motor vehicles (e.g., automobile, truck, etc.) designs, etc.

Accordingly, there still exists a need for an automated sun visor system which: (1) may be used with the front and/or side windows; (2) may be relatively easy for the user to control; (3) may be hidden from view when not deployed; and (4) may be installed with many different motor vehicle (e.g., automobile, truck, etc.) designs.

SUMMARY

According to a first broad aspect of the present invention, there is provided a sun visor system comprising:

- a main visor system assembly for mounting on a motor vehicle;
- a visor guide assembly;
- a visor extension arm having a first end that pivotally engages the main visor system assembly and a second end including an opening therethrough;
- a visor guide bar extending through and pivotally engaging the opening and slidably engaging the visor guide assembly;
- a sun visor connected to the visor guide bar
- wherein the main visor system assembly includes drive means for moving the visor extension arm between an extended and retracted position;
- wherein when the visor extension arm is moved between the extended and retracted positions to cause the visor guide to bar travel along the visor guide assembly, thereby moving the visor between a side window sun protecting position and a visor retracted position.

According to a second broad aspect of the present invention, there is provided an automatic sun visor system comprising:

- a main visor system assembly for mounting on a motor vehicle;
- a visor extension arm which is movable between an extended position and a retracted position;
- means associated with the main visor system assembly and connected to the visor extension arm for controllably moving the visor extension arm between extended and retracted positions;
- a visor guide assembly;
- a visor guide bar connected to the visor extension arm and comprising means for engaging the visor guide assembly for guided movement between visor guide bar extended and retracted positions in response to movement of the visor extension arm between visor extension arm extended and retracted positions;
- a visor for protecting an occupant of the motor vehicle from sun and/or glare, which is attached to the visor guide bar for movement between a side window sun protecting position and a retracted position in response to movement of the visor guide bar between visor guide bar extended and retracted positions.

BRIEF DESCRIPTION OF THE DRAWINGS

The invention will be described in conjunction with the accompanying drawings, in which.

DETAILED DESCRIPTION

It is advantageous to define several terms before describing the invention. It should be appreciated that the following definitions are used throughout this application.

Definitions

Where the definition of terms departs from the commonly used meaning of the term, Applicant intends to utilize the definitions provided below, unless specifically indicated.

For the purposes of the present invention, directional terms such as "top", "bottom", "above", "below", "left", "right", "up", "down", etc. are merely used for convenience in describing the various embodiments of the system of the present invention.

For the purposes of the present invention, the term "motor vehicle" may refer to an automobile, car, truck, van, bus, etc.

For the purposes of the present invention, the term "occupant" may refer to a driver, one or more passengers, or the driver and one or more passengers, of a motor vehicle.

For the purposes of the present invention, the term "user" refers to an occupant of a motor vehicle using an embodiment of the system of the present invention.

For the purposes of the present invention, the term "visor" refers to an element, component, etc., that may shade, screen, protect, etc., a user from the sun and/or the resulting or associated glare therefrom coming through or at the window.

For the purposes of the present invention, the term "side window sun protecting position" refers to a positioning of the sun visor relative to a side window of a motor vehicle such that the user is shaded, screened, protected, etc., against the sun and/or the resulting or associated glare therefrom coming through or at the window.

For the purposes of the present invention, the terms "operative position" or "operative configuration" refer interchangeably to an element, component, member, assembly, system, etc., that is in a usable, working functioning, etc., position or configuration.

For the purposes of the present invention, the terms "inoperative position" or "inoperative configuration" refer interchangeably to an element, component, member, assembly, system, etc., that is not in an operative position or configuration.

For the purposes of the present invention, the terms "extended position" or "extended configuration" refer interchangeably to an element, component, member, assembly, etc., that is in a stretched out, expanded, pulled out, lengthened, etc., position.

For the purposes of the present invention, the terms "retracted position" or "retracted configuration" refer interchangeably to an element, component, member, assembly, etc., that is in a contracted, withdrawn, drawn in, pulled in, etc., position.

For the purposes of the present invention, the term "arcuate slot" refers to a slot that follows a generally curved or arched shape.

For the purposes of the present invention, the term "positioned at" refers to the positioning of an element, component, member, assembly, etc., along, on, in, proximate, near, etc., another stated element, component, member, assembly, etc.

For the purposes of the present invention, the term "pivotally connected to" refers to a first element, component, member, assembly, etc., being coupled, connected, secured, attached, fixed, etc., to a second element, component, member, etc., so as to allow pivotal movement of the first element, component, member, assembly, etc., about an axis defined by the first element, component, member, etc.

Description

The present invention is directed broadly at embodiments of a sun visor system (e.g., an automatic or powered sun visor system) for use with a motor vehicle, such as an automobile, truck, etc. Embodiments of the sun visor system may be used with front and/or back side windows of the motor vehicle, on the driver side, the passenger side(s) or the driver and passenger side(s) to provide protection to the user from the sun and glare resulting therefrom or associated therewith. Embodiments of the sun visor system may be easily controlled by the user for moving the sun visor between protecting position and retracted positions, such that the sun visor may be hidden from view when in the retracted position. Embodiments of the sun visor system may be installed with many different motor vehicle designs, types, etc.

Figure 1:
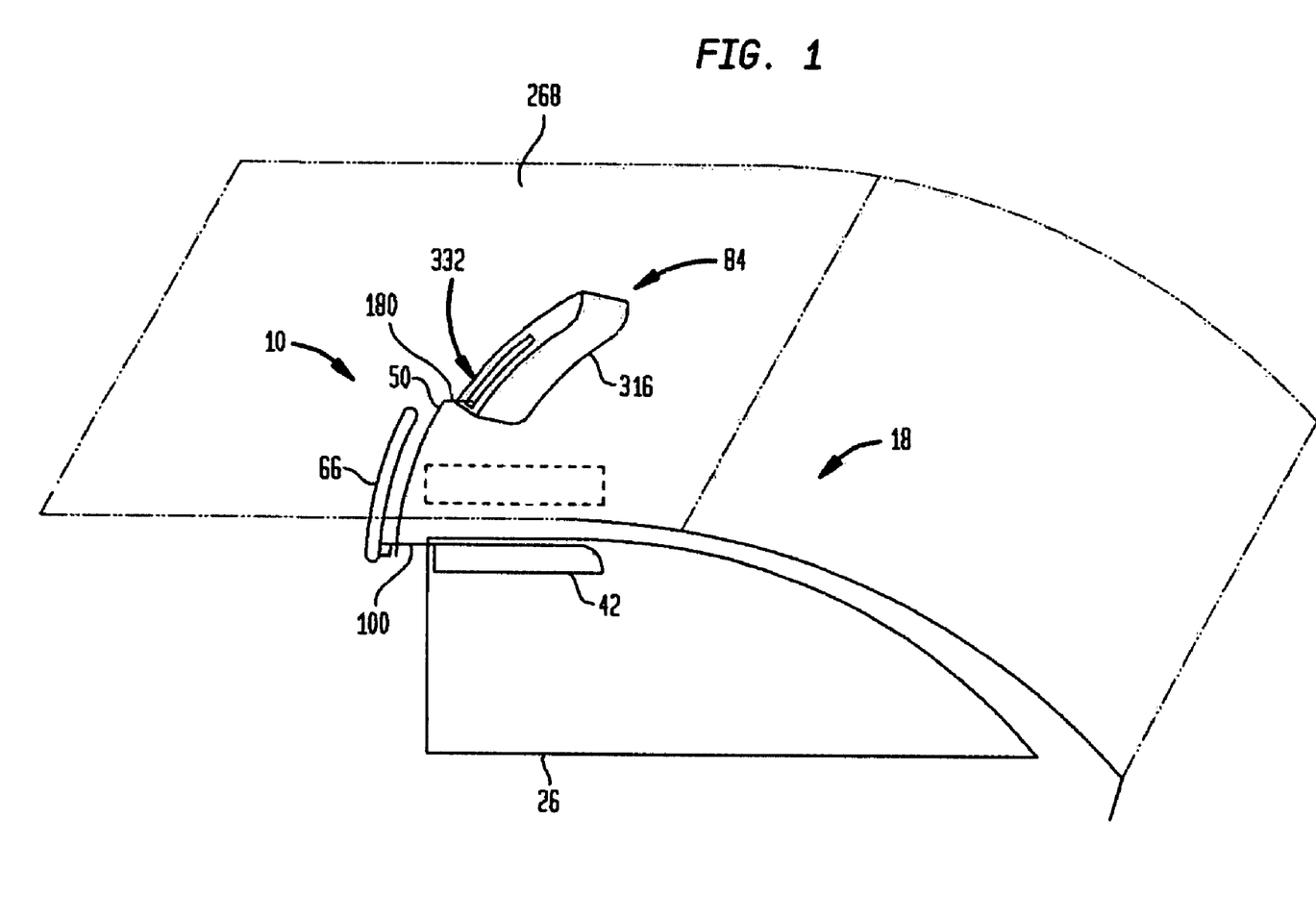
FIG. 1 is a side view of an upper portion of an automobile viewed from an angle above the driver side with an embodiment of an automatic visor system of the present invention, showing a sun visor in an extended (protecting) or operative position or configuration.
Figure 2:
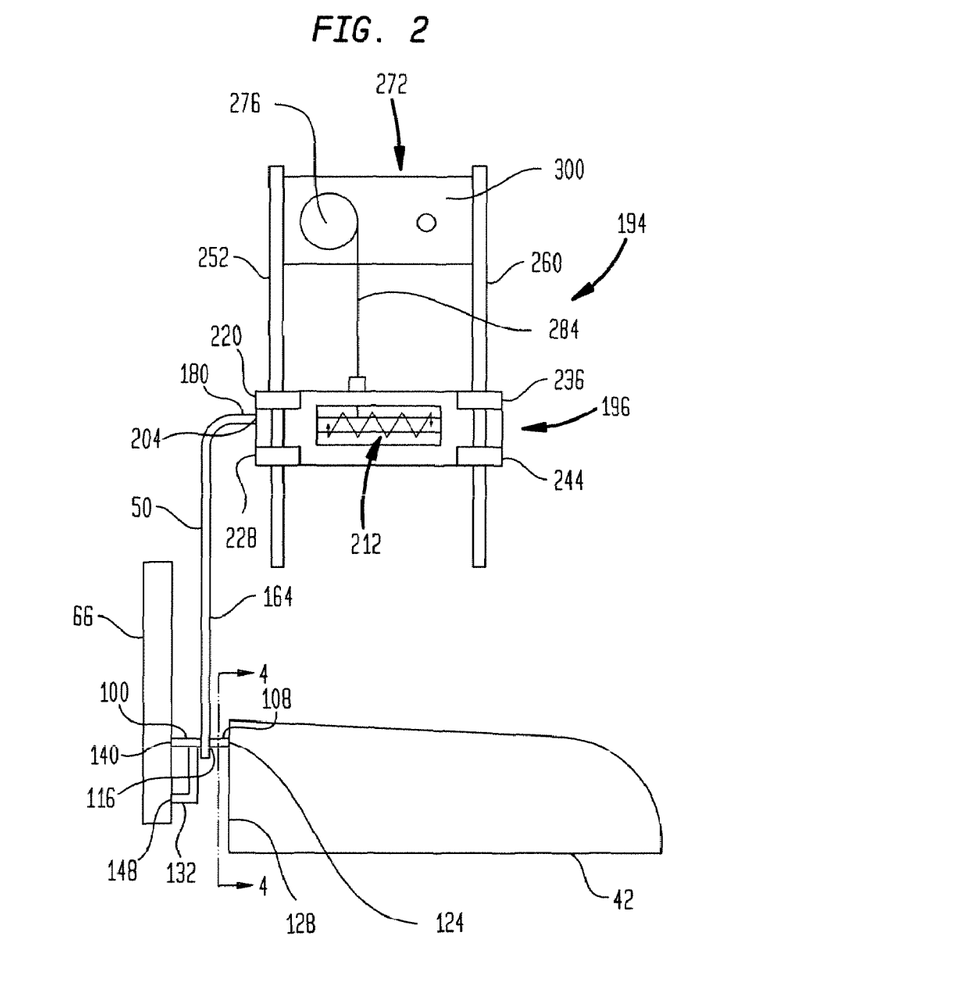
FIG. 2 is planar view of the automatic visor system of FIG. 1 with the cover of the main visor system assembly and other components removed to better illustrate the features thereof.
Figure 3:
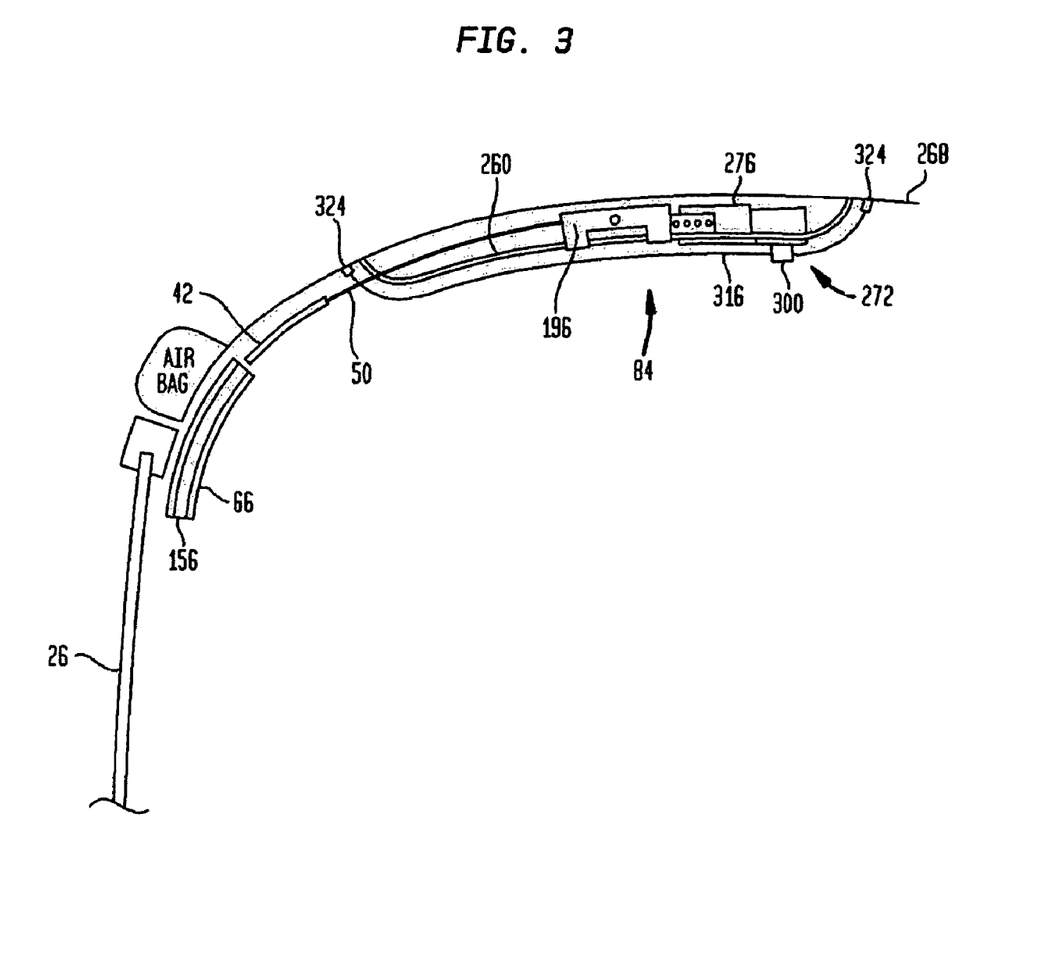
FIG. 3 is a sectional view of a portion of an automobile with a sectional view of the automatic visor system of FIG. 1, showing the sun visor in a retracted or inoperative position or configuration.
Figure 4:
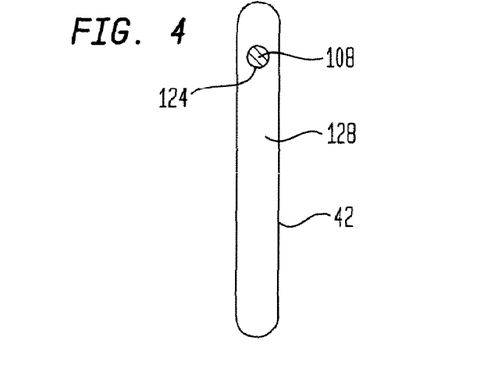
FIG. 4 is an end view of the visor taken along 4-4 of FIG. 2.

An embodiment of the automatic sun visor system of the present invention is illustrated in FIGS. 1 through 3. Referring to FIG. 1, an embodiment of an automatic or powered sun visor system of the present invention is indicated generally as 10. As shown in FIG. 1, visor system 10 may be used in connection with a motor vehicle, for example, an automobile indicated generally as 18, and with respect to a side window, such as, for example, the driver side window, indicated as 26, to protect the driver from the sun and especially glare associated with side window 26. As shown in FIG. 1, visor system 10 may be positioned in various positions, locations, etc., along the interior of automobile 18, as further described below. Visor system 10 may include a visor, indicated generally as 42, a generally L-shaped visor extension arm, indicated generally as 50, a visor guide assembly, indicated generally as 66, a main visor system assembly, indicated generally as 84, and a visor guide bar, indicated generally as 100.

In the embodiment illustrated in FIG. 1, visor 42 may of any suitable shape (e.g., generally rectangular as shown in FIG. 1) and may be made from any suitable material, such as, for example, plastic, rubber, textile, metal, etc. Such materials may additionally have sun absorbing or reflecting properties in order to enhance the functionality of sun visor 42. In certain embodiments, visor 42 may comprise a single integrally molded element, while in other, alternative embodiments, visor 42 may comprise a plurality of connected or attached elements. In still other embodiments, visor 42 may comprise one more elements covered, wrapped, surrounded, etc., by an additional suitable material. For example, visor 42 may comprise a first integrally molded plastic element covered by a suitable material such as, for example, cloth, fabric, felt, leather, nylon, etc., for, for example, aesthetic reasons, functional reasons, etc. Such suitable covering materials may provide sun absorbing, sun reflecting, etc., capabilities for sun visor 42.

As shown in FIG. 1, visor 42 may be connected or attached (e.g., fixedly attached) to visor guide bar 100. Visor guide bar 100 may be configured to engage visor guide assembly 66 and may be pivotally coupled or connected to visor extension arm 50 for movement between extended and retracted positions in response to the movement of extension arm 50. Extension arm 50 may be appropriately configured and operated for movement between extended and retracted positions by main visor system assembly 84, as described below.

Referring to FIG. 2, visor guide bar 100 may comprise means for engaging visor guide assembly 66 in the form of, for example, a cylindrical portion, indicated generally as 108, which may be inserted through a pivot hole, indicated as 116, within and proximate to or at one end of visor extension arm 50, for pivotal movement of cylindrical portion 108 about the longitudinal axis defined by cylindrical portion 108. One end of cylindrical portion 108, indicated as 124, may be fixedly secured, attached, etc., at or proximate to one end, indicated as 128, of visor 42. Visor guide bar 100 may further comprise means for engaging visor guide assembly 66 in the form of, for example, a generally L-shaped portion, indicated as 132, which may be connected to, attached to, integral with, etc., cylindrical portion 108. The other guide end of cylindrical portion 108, indicated as 140, as well as the guide end of L-shaped portion 132, indicated as 148, together provide two spaced apart guide portions which may be slidably received and engaged by a visor bar guide member in the form of, for example, arcuate slot 156 in visor guide assembly 66. Guide ends 140 and 148 move within slot 156, to thereby guide the movement of visor guide bar 100 as it travels along slot 156 between an extended and operative configuration or position, and a retracted and inoperative configuration or position, thus causing visor 42 to move in response thereto between a side window sun protecting and operative configuration or position, and a retracted and inoperative configuration or position.

In an alternative embodiment of system 10, visor guide bar 100 may comprise a solely cylindrical portion 108 (i.e., L-shaped portion 132 is absent). In such an alternative embodiment, visor guide bar 100 may function similar to visor guide bar 100 shown in FIG. 2, i.e., cylindrical portion 108 may be inserted through an opening in one end of a visor extension arm 50, for example, a pivot hole, indicated as 116, to allow for pivotal movement of visor guide bar 100, with one end of cylindrical portion 108 being attached to visor 42, while the other end of cylindrical portion 108 may be slidably received by and engage arcuate slot 156 for guiding the movement of visor guide bar 100 as it travels along slot 156 between the extended and operative configuration, and a retracted and inoperative configuration, thus causing visor 42 to move in response thereto between a side window sun protecting and operative configuration or position, and a retracted and inoperative configuration or position. In an alternate embodiment of visor guide bar 100, portion 132 may also have configurations other than L-shaped.

In certain embodiments of the present invention, guide end 140 of cylindrical portion 108, and guide end 148 of L-shaped portion 132 may be received by arcuate slot 156, and may be frictionally engaged therewith. In alternative embodiments, guide end 140 of cylindrical portion 108, and guide end 148 of L-shaped portion 132 may be engaged by arcuate slot 156 such that guide ends 140 and 148 may be mechanically locked therein. For example, arcuate slot 156 may comprise a generally triangular cross-section, with a greater width at the portion of slot 156 opposite the opening, and a smaller cross-section at the opening of slot 156, i.e., slot 156 narrows in width from the opening to the portion of slot 156 opposite the opening. In order to provide the desired locking configuration, guide end 140 of cylindrical portion 108, and guide end 148 of L-shaped portion 132 may also have a generally triangular cross-section such that guide ends 140 and 148 have the greatest width at their respective ending points. In such embodiments, guide ends 140 and 148 may be firstly engaged by arcuate slot 156 by sliding the end portions of guide ends 140 and 148 into arcuate slot 156 from one end of slot 156 which mechanically prevents guide ends 140 and 148 from being disengaged from slot 156. It may also be appreciated that arcuate slot 156 and guide ends 140 and 148 may have cross-sections other than generally triangular, such as a generally T-shaped cross-sections, square cross-sections, etc., without departing from the spirit and scope of the present invention.

Returning again to the embodiment of visor system 10 illustrated in FIG. 2, visor extension arm 50 may be generally L-shaped and may comprise an elongated extension portion, indicated as 164, which may include pivot hole 116 at one end thereof, and which may be connected or integral at the other end thereof with a pivot portion, indicated as 180. As shown in FIG. 2, pivot portion 180 may be associated and operable with main assembly 84. Main assembly 84 may be provided or associated with a drive assembly, indicated generally by 194. Drive assembly 194 may include a slide assembly, for example, in the form of a guide rod follower member, indicated generally as 196. Guide rod follower member 196 has an opening in the form of a hole, indicated as 204, which may be formed therein through which pivot portion 180 is received for pivotal movement of visor extension arm 50 about the longitudinal axis defined by pivot portion 180. (Although not shown in FIG. 2, the end of pivot portion 180 opposite where pivot portion 180 is inserted through hole 204 may be received by, for example, a circular or cylindrical-shaped recess formed in guide rod follower member 196 so that pivot portion 180 may pivot in a stable and consistent manner about the longitudinal axis defined by pivot portion 180.) Means for biasing or urging visor extension arm 50 upwardly and into a retracted position may be provided by a biasing element in guide rod follower member 196, and is indicated generally as 212 in FIG. 3. In embodiments of the present invention, biasing element 212 may comprise, for example, a torsion spring, which may be provided with guide rod follower member 196.

Guide rod follower member 196 may be further provided with at least one guide receiving member (e.g., at least two guide receiving members), for example, in the form of a first pair of guide rod receiving members, indicated as 220 and 228, and a second pair of guide rod receiving members, indicated as 236 and 244. Guide rod receiving members 220 and 228 are provided with appropriately sized holes (not shown) for slidably receiving respective guide rod 252, while guide rod receiving members 236 and 244 may also be provided with appropriately sized holes (not shown) for slidably receiving respective guide rod 260 which is laterally spaced apart from guide rod 252. Alternatively, guide rod follower member 196 may be provided with or have formed therein, for example, arcuate or semicircular indentations or recesses in place of receiving members 220/236 and receiving members 228/244 for receiving respective guide rods 252 and 260 which may be laterally spaced apart such that assembly 196 may slidably move therebetween without falling off of guide rods 252 and 260. In one such alternative embodiment, guide rods 252 and 260 may be frictionally held by or in the arcuate or semicircular indentations. In still other alternative embodiments, guide rods 252 and 260 may be locked by or in such arcuate or semicircular indentations. In yet another alternative embodiment, one guide rod such as 252 (or 260) may be provided, where the one guide rod 252 (or 260) has a cross-section (e.g., square-shaped, rectangular-shaped, etc.) for receiving assembly 196 for slidable movement. As shown in FIG. 3, guide rods 258 and 260 may be secured, attached, etc., to the roof of automobile 18, indicated as 268.

Referring again to FIG. 2, main assembly 84 may also be provided with a motor and switch assembly, indicated generally as 272, for controlling the operation of system 10. Assembly 272 may include a motor (e.g., a pancake motor such as may be used with automatic motor vehicle windows, a stepper motor, a torque motor, a linear motor, etc.), indicated as 276, a flexible but sufficiently stiff or rigid connector or link, indicated as 284, which may be connected to and extend from motor 276 and which may be connected to guide rod follower member 196, and which is capable of causing lateral and reciprocal movement of guide rod follower member 196 along guide rods 252 and 260 in response to the action of motor 276. As would be appreciated by one skilled in the art, link 284 may comprise any material that is sufficiently flexible and rigid to enable movement of guide rod follower member 196. In certain embodiments, link 284 may comprise a nylon cog strap.

Assembly 272 may further include a switch (e.g., an up-down switch), indicated generally as 300, for controlling the action of motor 276. As shown in FIGS. 2 and 3, assembly 272 may be attached or secured to guide rods 252 and 260. Main assembly 84 may also be provided with a cover, indicated generally as 316, and having one or more cover retainers or clips (often four clips proximate each corner thereof), two of which are indicated as 324, which may be used to secure, couple, connect, attach, etc., cover 316 to guide rods 252 and 260 in such a manner so as to also hide or cover rods 252 and 260. In an alternative embodiment, clips 324 may secure cover 316 directly to the interior of automobile 18. Cover 316 may be shaped or configured to allow engagement of switch 300 while covering or hiding substantially all other components of main assembly 84. As shown in FIG. 1, cover 316 may be provided with an elongated slot 332 to permit and guide the movement of pivot portion 180 of visor extension arm 50 as it travels along the length of slot 332.

As shown in FIG. 3, cover 316 may cover the interior components of main assembly 84. In other embodiments not shown, cover 316 may also be shaped or configured to cover or hide visor guide assembly 66. In such embodiments, when system 10 is in a retracted configuration, visor 42 would be retracted entirely into cover 316. Also in such embodiments, when system 10 is in the extended configuration, only visor 42, visor guide bar 100 and/or portions of visor extension arm 50 may extend from cover 316, thereby allowing substantially all components of system 10 to remain covered or hidden. It should also be appreciated that cover 316 may comprise two or more sections to allow for sectionalized repair or maintenance of visor system 10.

If a user desires to actuate or operate visor system 10 to change system 10 from the retracted or inoperative configuration of FIG. 3 to the extended or operative configuration shown in FIG. 1, the user may push or engage switch 300, e.g., by pushing an on-off button. In one embodiment, the user may press switch 300 once, thus causing visor system 10 to change to the extended or operative configuration. When system 10 is in the extended or operative configuration, the user may also press switch 300 once, thus causing system 10 to change to the retracted or inoperative configuration, or to any position between fully operative and fully inoperative positions. In another embodiment, the user may push and hold switch 300 until visor 42 reaches a desired, operative position. In such an embodiment, when the user releases switch 300 the visor may remain in the desired, operative position. The user may also push and hold switch 300 until to cause visor 42 to move into a retracted and inoperative position, or any position between fully operative and fully inoperative positions.

In operation, when the user pushes or otherwise actuates or operates switch 300 while system 10 is in the inoperative position, motor 276 is engaged. The engagement of motor 276 causes link 284 to move guide rod follower member 196 away from motor 276 along guide rods 252 and 260. The movement of guide rod follower member 196 away from motor 276 causes visor extension arm 50 to move and extend away from main assembly 84. As visor extension arm 50 moves and extends from main assembly 84, visor guide bar 100 is engaged and guided by arcuate slot 156 in visor guide assembly 66 to move from a retracted to an extended positions, thus causing visor 42 to move from a retracted and inoperative position or configuration, to an extended protecting and operative position or configuration.

It should be appreciated that in alternative embodiments, assembly 272 may include additional switches to control other operations of visor system 10. In one such embodiment, assembly 272 may include a switch to control the extended (protecting) and/or retracted (hidden) position of visor 42. In such embodiments, if a user wishes to stop visor 42 before it reaches the fully extended (protecting) position, the user may engage the additional switch to automatically stop the extension of visor 42. Visor 42 would then stay in this desired position until the user actuates system 10 to retract visor 42 or chooses another position for visor 42.

In embodiments of visor system 10, once visor 42 has reached a desired position, visor 42 may be configured to pivot about the axis of cylindrical portion 108 of visor guide bar 100, thereby allowing the user to adjust the orientation of visor 42. In one such embodiment, the user may adjust the orientation of visor 42 manually. In other such embodiments, assembly 272 may further comprise additional switches that enable a use to change the orientation of visor 42 to a desired orientation automatically.

In other embodiments of the present invention, visor system 10 may be configured such that, when system 10 is actuated or operated so as to be converted or changed to its extended or operative configuration, system 10 may automatically place visor 42 in both a preselected or predetermined position and orientation in accordance with preselected or predetermined settings of the user. In such embodiments, assembly 272 may include programming, circuitry, etc., to which a user of system 10 may program preferred, favorite or desired positions and orientations for visor 42.

In still other embodiments of the present invention, visor system 10 may further include an apparatus or device for detecting the level of sunlight and/or glare incident on a window or windows of automobile 18. In such embodiments, if the level of sunlight and/or glare detected by the device exceeds a predetermined level, control hardware, software, etc., in or associated with system 10 may automatically deploy visor 42 into a sun protecting position. Similarly, once visor 42 is in a protecting position, if the level of sunlight and/or glare detected by the device falls below a certain predetermined level system, 10 may retract visor 42 in response thereto. In such situations, system 10 may retract visor 42 immediately, or system 10 may only retract visor 42 after the level of sunlight and/or glare remains below the predetermined level for a predetermined amount of time. As would be appreciated by those skilled in the art, in these alternative embodiments, system 10 may include mechanisms, devices, etc., such that the user may override or deactivate the automatic deployment or retraction of visor 42 in response to sunlight and/or glare levels.

In still another embodiment, system 10 may also include hardware, software, etc., to control the deployment or retraction of visor 42 in response to oral, body movement (e.g., hand signals), etc., commands given by the user in automobile 18.

In yet other embodiments of system 10, when the user desires to change visor system 10 from the extended (and protecting or operative) configuration shown in FIG. 1 to the retracted (and inoperative) configuration of FIG. 3, the user may again push switch 300. The engagement of switch 300 may actuate or cause motor 276 to retract link 284. The retraction of link 284 may cause guide rod follower member 196 to move towards motor 276 along guide rods 252 and 260. As guide rod follower member 196 moves towards motor 276, visor extension arm 50 may also move towards motor 276. The movement of visor extension arm 50 towards motor 276 may cause visor guide bar 100 to be guided by arcuate slot 156 towards main assembly 84 until visor 42 reaches the desired retracted (and hidden or inoperative) position.

It should be appreciated that the embodiment illustrated in FIGS. 1 through 3 is provided to illustrate the teachings of the present invention. Alterations or modifications within the skill of the art of the embodiment shown in FIGS. 1 through 3 are considered within the scope of the present invention, so long as these alterations or modifications operate in a same or similar manner, function, etc.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. A sun visor system comprising:
a main visor system assembly for mounting on a motor vehicle;
a visor guide assembly;
a visor extension arm having a first end that pivotally engages the main visor system assembly and a second end including an opening therethrough;
a visor guide bar extending through and pivotally engaging the opening and slidably engaging the visor guide assembly; and
a sun visor connected to the visor guide bar;
wherein the main visor system assembly includes drive means for moving the visor extension arm between an extended and retracted position;
wherein when the visor extension arm is moved between the extended and retracted positions to cause the visor guide bar to travel along the visor guide assembly, to thereby cause the visor to be moved between a side window sun protecting position and a visor retracted position;
wherein the visor guide assembly includes an arcuate slot which slidably engages and guides the movement of the visor guide bar as the visor moves the between the side window sun protecting position and the visor retracted position;
wherein the visor guide bar comprises two spaced apart end portions that slidably engage the arcuate slot of the visor guide assembly.

2. A sun visor system comprising:
a main visor system assembly for mounting on a motor vehicle;
a visor guide assembly;
a visor extension arm having a first end that pivotally engages the main visor system assembly and a second end including an opening therethrough;
a visor guide bar extending through and pivotally engaging the opening and slidably engaging the visor guide assembly; and
a sun visor connected to the visor guide bar;
wherein the main visor system assembly includes drive means for moving the visor extension arm between extended and retracted positions, wherein the drive means comprises a slide assembly that moves along two spaced apart guide members and wherein the first end of the visor extension arm pivotally engages the slide assembly;
wherein when the visor extension arm is moved between the extended and retracted positions to cause the visor guide bar to travel along the visor guide assembly, the visor is thereby moved between a side window sun protecting position and a visor retracted position.

3. An automatic sun visor system comprising:
a main visor system assembly for mounting on a motor vehicle;
a visor extension arm which is movable between visor extension arm extended and retracted positions;
means associated with the main visor system assembly and connected to the visor extension arm for controllably moving the visor extension arm between visor extension arm extended and retracted positions.
a visor guide assembly comprising an arcuate slot;
a visor guide bar connected to the visor extension arm and comprising means for engaging the visor guide assembly for guided movement between visor guide bar extended and retracted positions in response to movement of the visor extension arm between visor extension arm extended and retracted positions;
a visor for protecting an occupant of the motor vehicle from sun and/or glare, which is attached to the visor guide bar for movement between a side window sun protecting position and a retracted position in response to movement of the visor guide bar between visor guide bar extended and retracted positions;
wherein the engaging means comprises: (1) a cylindrical portion having one end fixedly attached to the visor, and (2) first and second guide ends;
wherein the arcuate slot receives the first and second guide ends to thereby guide the visor guide bar between visor guide bar extended and retracted positions.

4. An automatic sun visor system comprising:
a main visor system assembly for mounting on a motor vehicle;
a visor extension arm which is movable between visor extension arm extended and retracted positions;
means associated with the main visor system assembly and connected to the visor extension arm for controllably moving the visor extension arm between visor extension arm extended and retracted positions.
a visor guide assembly;
a visor guide bar connected to the visor extension arm and comprising means for engaging the visor guide assembly for guided movement between visor guide bar extended and retracted positions in response to movement of the visor extension arm between visor extension arm extended and retracted positions;
a visor for protecting an occupant of the motor vehicle from sun and/or glare, which is attached to the visor guide bar for movement between a side window sun protecting position and a retracted position in response to movement of the visor guide bar between visor guide bar extended and retracted positions;
wherein the means for controllably moving the visor extension arm comprises: (1) a drive assembly which includes a slide assembly connected to the visor extension arm and comprising a guide rod follower member; (2) a pair of laterally spaced apart guide rods; (3) at least two guide rod receiving members, one of the receiving members slidably receiving one of the guide rods, the other receiving member slidably receiving the other guide rod for slidable movement of the slide assembly along the guide members; wherein the means for controllably moving the visor extension arm further comprises drive means for moving the slide assembly along the guide members to thereby cause the visor extension arm to move between visor extension arm extended and retracted positions.

5. The system of claim 2, wherein the visor guide assembly includes an arcuate slot which slidably engages and guides the movement of the visor guide bar as the visor moves the between the side window sun protecting position and the visor retracted position.

6. The system of claim 5, wherein the visor guide bar comprises two spaced apart end portions that slidably engage the arcuate slot of the visor guide assembly.

7. The system of claim 1, wherein the drive means comprises a slide assembly that moves along at least one guide member.

8. The system of claim 1 wherein the drive means comprises a slide assembly that moves along two spaced apart guide members.

9. The system of claim 8, wherein the first end of the visor extension arm pivotally engages the slide assembly.

10. The system of claim 2, wherein the drive means further comprises a motor and switch assembly moving the slide assembly between an extended slide assembly position and retracted slide assembly position.

11. The system of claim 2, wherein the main visor assembly includes means for biasing the slide assembly towards a slide assembly retracted position, thereby biasing the sun visor towards the visor retracted position.

12. The system of claim 2, wherein the main visor assembly is attached to interior of the roof of the motor vehicle.

13. The system of claim 2, wherein the main visor assembly further comprises means for detecting the level of sunlight and/or glare incident on a window of the automobile, and means responsive to the detecting means for controlling the drive means based on the level of sunlight and/or glare incident on the detecting means.

14. The system of claim 2, wherein the main visor assembly further comprises means for controlling the drive means in response to commands from the user.

15. The system of claim 4 wherein the engaging means comprises a cylindrical portion having one end fixedly attached to the visor means and a guide end which engages the visor guide assembly.

16. The system of claim 15, wherein the engaging means further comprises a second guide end which engages the visor guide assembly.

17. The system of claim 16, wherein the visor guide assembly comprises an arcuate slot which receives the first and second guide ends to thereby guide the visor guide bar between visor guide bar extended and retracted positions.

18. The system of claim 3, wherein the means for controllably moving the visor extension arm comprises a drive assembly which includes a slide assembly connected to the visor extension arm, at least one guide member comprising means for slidably receiving the slide assembly for slidable movement of the slide assembly along the at least one guide member, wherein the means for controllably moving the visor extension arm further comprises drive means for moving the slide assembly along the at least one guide member to thereby cause the visor extension arm to move between visor extension arm extended and retracted positions.

19. The system of claim 18, wherein the at least one guide member comprises a pair of laterally spaced apart guide rods, and wherein the slide assembly comprises a guide rod follower member and wherein the means for slidably receiving the slide assembly comprises at least two guide rod receiving members, one of the receiving members slidably receiving one of the guide rods, the other receiving member slidably receiving the other guide rod.

20. The system of 4, wherein the drive means comprises a motor and switch assembly and means for connecting the motor and switch assembly to the guide rod follower member to thereby cause the guide rod follower member to move between visor extension arm extended and retracted positions when motor and switch assembly is activated.

\* \* \* \* \*